United States Patent
Ryan

[19]
[11] Patent Number: 5,951,023
[45] Date of Patent: Sep. 14, 1999

[54] AIR CHUCK

[75] Inventor: Todd A. Ryan, Newton, N.J.

[73] Assignee: JRC Web Accessories, Inc., Fairfield, N.J.

[21] Appl. No.: 09/085,794

[22] Filed: May 28, 1998

[51] Int. Cl.[6] .............................. B23B 31/40; B23B 31/30
[52] U.S. Cl. .................. 279/2.07; 242/571.1; 242/576.1; 279/4.11; 294/98.1
[58] Field of Search ................................. 279/2.07, 2.08, 279/4.03, 4.11; 242/571.1, 571.2, 576.1; 294/98.1

[56] References Cited

U.S. PATENT DOCUMENTS

| | | | |
|---|---|---|---|
| 2,826,445 | 3/1958 | Tidland | 294/98.1 |
| 3,029,037 | 4/1962 | Williams et al. | 242/571.1 |
| 3,048,345 | 8/1962 | Willard | 242/571.1 |
| 3,286,987 | 11/1966 | Bridges | 242/571.1 |
| 3,741,571 | 6/1973 | Prazak | 242/571.1 |
| 4,135,677 | 1/1979 | Warczak | 242/571.1 |
| 4,195,792 | 4/1980 | Hall | 242/571.1 |
| 4,616,392 | 10/1986 | Snyder | 279/2.08 |
| 5,499,780 | 3/1996 | Gensheimer | 242/571.1 |

*Primary Examiner*—Steven C. Bishop
*Attorney, Agent, or Firm*—Richard M. Goldberg

[57] ABSTRACT

An air chuck includes a central core having a central portion, an enlarged end flange at a first end, a sloped transition section between the central portion and the enlarged end flange and having an outer inclined surface at a first inclination angle of 20°, a sloped end section at the opposite end of the central portion and having an outer inclined surface at a second inclination angle of 20°, and an air passage connected with an external surface of the central section; a rubber air bladder mounted on the central core; a housing in surrounding relation to the central core and the bladder, and including a central section, one end engaging the end flange with the central section in radially spaced relation from the air bladder, an opposite end, and a plurality of through holes spaced along the central section; a plurality of outer and inner leaves positioned externally and internally of the housing, and being connected by connecting rods so that the leaves move radially outward in response to pressurization of the bladder; a first angled ring at the one end of the housing has a third inclination angle of 25° in the same direction as the first inclination angle, so as to pinch the bladder therebetween; a second angled ring at the opposite end of the housing has a fourth inclination angle of 15° in the same direction as the second inclination angle, so as to pinch the bladder therebetween.

20 Claims, 5 Drawing Sheets

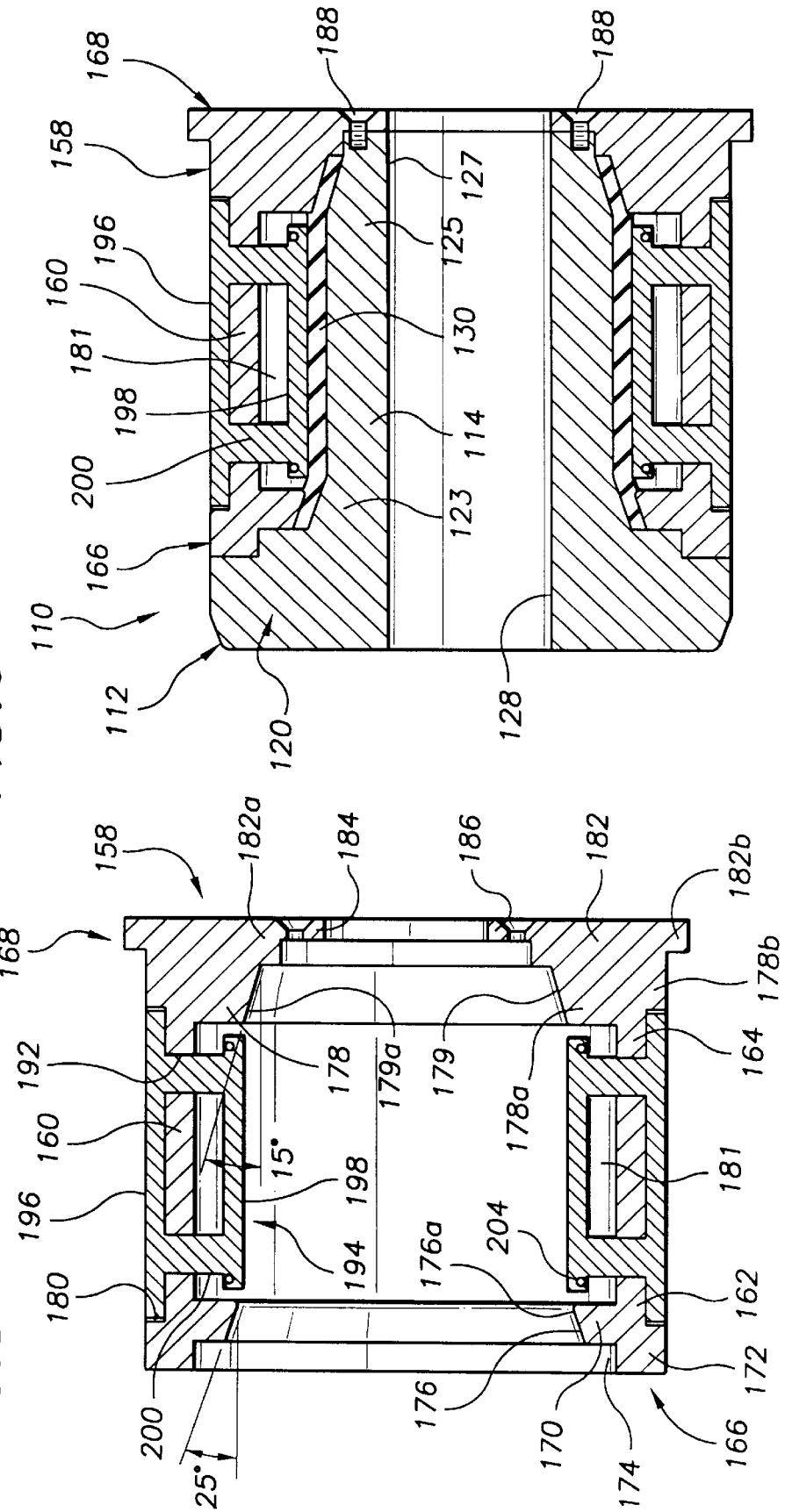

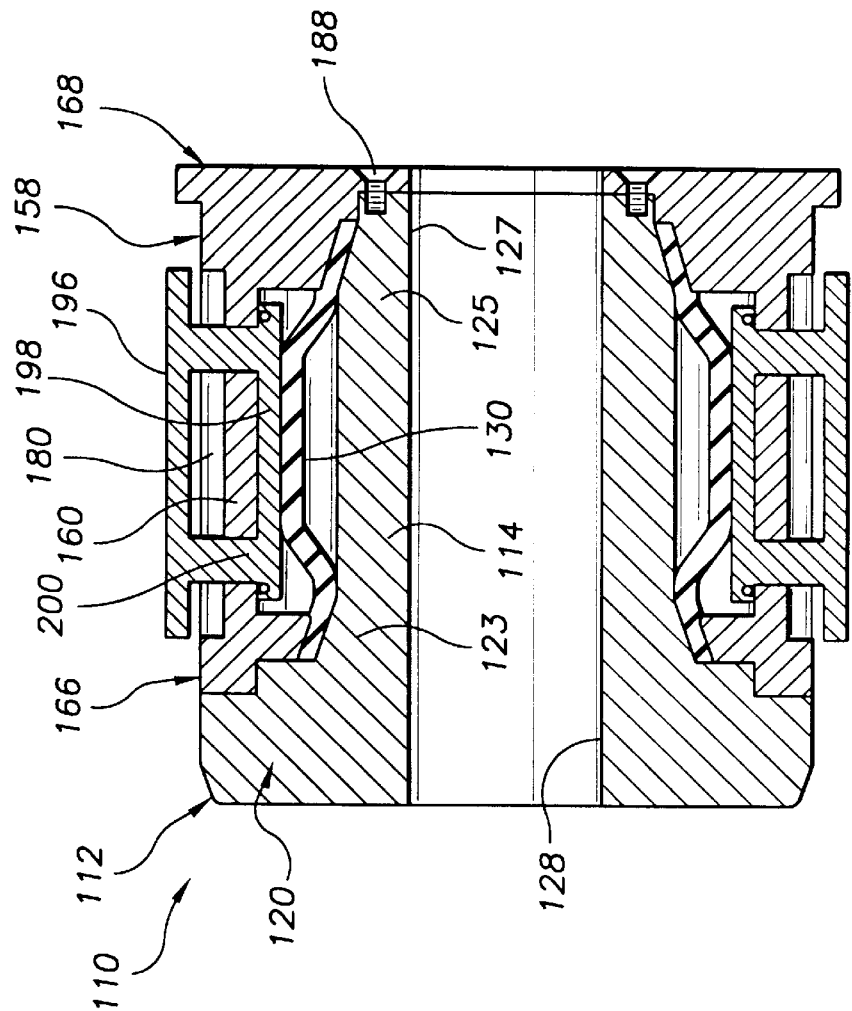
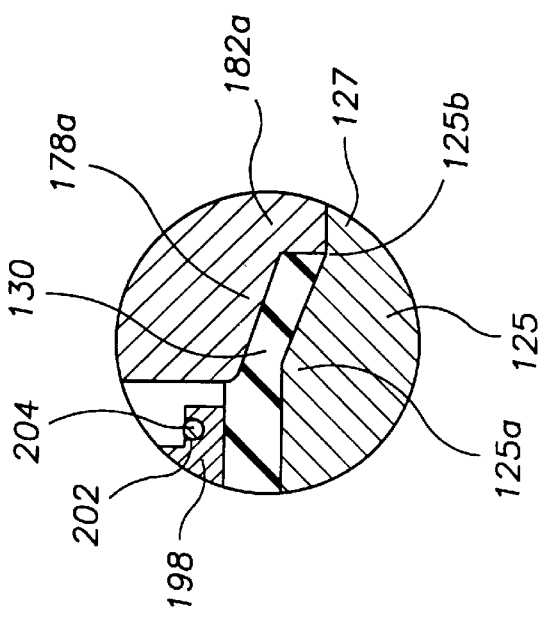
FIG. 8
FIG. 7

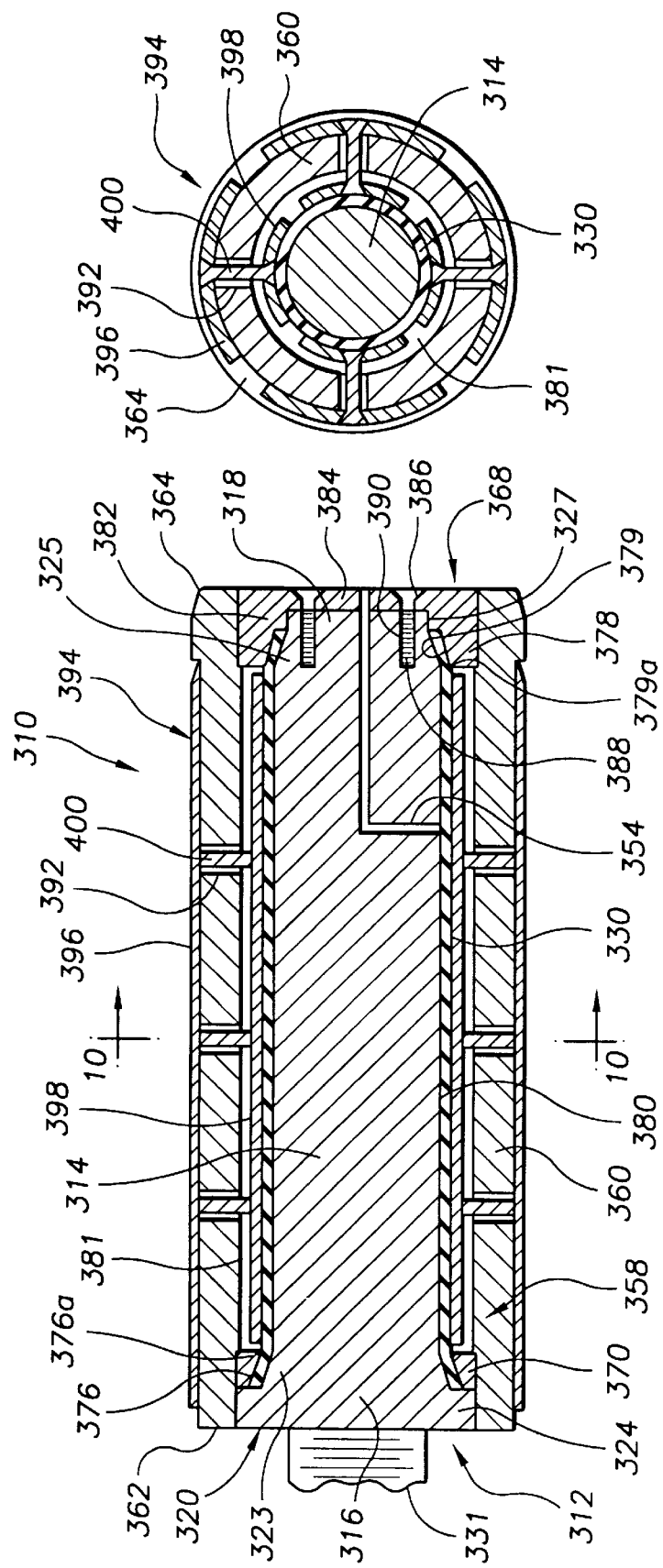

AIR CHUCK

BACKGROUND OF THE INVENTION

This invention relates generally to air chucks, and more particularly, is directed to an improved air chuck that permits quick and easy replacement of the air bladder therein.

Air chucks have conventionally been used to hold rolls of web material on machines, while permitting unwinding and rewinding of the webs from the rolls.

Specifically, a conventional air chuck includes a central core having an air bladder wrapped therearound. The air bladder is secured by metal bands which press down at opposite ends of the air bladder to secure the air bladder to the core. An air passage is provided in the central core for supplying air against the inner surface of the air bladder, thereby deforming the same radially outwardly. A plurality of leaves are mounted in a lengthwise direction of the air chuck on top of the bladder, and are adapted to move radially outward by a small amount. When air is supplied through the air passage, the air bladder is inflated outwardly and presses the leaves outwardly so as to securely hold the roll of web material on the air chuck.

However, a problem with such arrangement is that the air bladder often gets worn out and must be replaced. This is a long and complicated procedure. Specifically, as a first step, the leaves must all be removed. Then, the metal bands which hold the ends of the air bladder must be removed, followed by removal of the air bladder. A reverse procedure is then performed, by applying a new air bladder, securing the same by the metal bands, and then securing the leaves thereon.

This procedure can take upwards of two or more hours, and results in substantial downtime of the web winding machine.

OBJECTS AND SUMMARY OF THE INVENTION

Accordingly, it is an object of the present invention to provide an air chuck that overcomes the aforementioned disadvantages of the prior art.

It is another object of the present invention to provide an air chuck that substantially reduces the time for replacement of a worn air bladder.

It is still another object of the present invention to provide an air chuck that eliminates the metal bands for holding the air bladder in place.

It is yet another object of the present invention to provide an air chuck that does not require the removal of the leaves in order to change the bladder.

It is a further object of the present invention to provide an air chuck that has a positive wedged pinching of the bladder onto the core of the air chuck at a circumferential line.

It is a still further object of the present invention to provide an air chuck in which there is simultaneous wedging of both ends of the air bladder during changing of the same by merely inserting the central core into the housing.

It is a yet further object of the present invention to provide an air chuck of the above type that provides a plurality of outer leaves that are radially movable for engaging the web roll.

It is another object of the present invention to provide an air chuck that is easy and economical to assemble and manufacture.

In accordance with an aspect of the present invention, an air chuck includes a central core having a central portion with a first end and a second opposite end, an enlarged end flange at the first end of the central core, a sloped transition section which connects the first end of the central portion and the enlarged end flange, the sloped transition section having an outer diameter adjacent to the enlarged end flange which is greater than an outer diameter adjacent to the first end of the central portion so as to slope down from the enlarged end flange toward the central portion at a first inclination angle relative to an axis of the air chuck, a sloped end section having a first end and a second end, with the first end of the sloped end section connected to the second end of the central portion, the first end of the sloped end section having an outer diameter greater than an outer diameter of the second end of the sloped end section so as to slope down from the first end portion toward the second end of the sloped end section at a second inclination angle relative to an axis of the air chuck, and an air passage for supplying pressurized air to an external surface of the central section. A resilient, deformable air bladder is mounted on the central portion, the sloped transition section and the sloped end section. A unitary housing is removably positioned in surrounding relation to the central core and the air bladder, the housing including a central section surrounding the central portion of the central core, a first end which engages the end flange such that the central section of the housing is in radially spaced relation from the air bladder, a second opposite end, and a plurality of through holes spaced along the central section of the housing. At least one locking member is positionable externally of the housing for engaging a web roll mounted on the housing, and a biasing assembly extends through the through holes into a space between the housing and the bladder, and is also connected to the at least one locking member for moving the at least one locking member radially outward relative to the housing in response to movement of the bladder when pressurized air is supplied through the air passage. A first angled wall is associated with the first end of the housing and has a third inclination angle which is in the same direction as the first inclination angle of the sloped transition section, so as to clamp the bladder therebetween. A second angled wall is associated with the second end of the housing and has a fourth inclination angle which is in the same direction as the second inclination angle of the sloped end section, so as to clamp the bladder therebetween. Thus, the central core and air bladder thereon are movable as a unit in an axial direction thereof out of and into the housing to change the air bladder on the central core, without removal of the at least one locking member and the at least one biasing assembly from the housing, and during insertion of the central core and air bladder into the housing, opposite ends of the bladder are wedged in a clamping manner by the sloped transition section and the first angled wall, and the sloped end section and the second angled wall, respectively.

Preferably, the third inclination angle is greater than the first inclination angle, and the fourth inclination angle is less than the second inclination angle, while the first and second inclination angles are substantially equal.

In one embodiment, the first angled wall is connected with the first end of the housing, and the second angle wall is connected with the second end of the housing.

In another embodiment, a first annular ring is positioned between the first end of the housing and the bladder, the first annular ring including the first angled wall as an inner wall thereof; and a second annular ring is positioned between the second end of the housing and the bladder, the second annular ring including the second angled wall as an inner wall thereof.

Further, the at least one locking member includes at least one outer leaf positioned externally of the housing; and the biasing assembly includes at least one inner leaf positioned between the housing and the bladder; and at least one connecting member extending through the through holes and connecting together the at least one outer leaf and the at least one inner leaf, such that movement of the at least one inner leaf in a radial direction in response to movement of the air bladder, results in the same radial movement of the at least one outer leaf. Preferably, there are a plurality of outer and inner leaves arranged circumferentially around the air chuck.

In addition, an end cap assembly is positioned at the second end of the housing for securement to the central core and for further pulling the central core into the housing to increase the clamping of the opposite ends of the bladder.

In accordance with another aspect of the present invention, an air chuck includes a central core having a central portion with a first end and a second opposite end, an enlarged end flange at the first end of the central core, a sloped transition section which connects the first end of the central portion and the enlarged end flange, the sloped transition section having an outer diameter adjacent to the enlarged end flange which is greater than an outer diameter adjacent to the first end of the central portion so as to slope down from the enlarged end flange toward the central portion at a first inclination angle relative to an axis of the air chuck, and an air passage for supplying pressurized air to an external surface of the central section. A resilient, deformable air bladder is mounted on the central portion and the sloped transition section. A housing is provided in surrounding relation to the central core and the air bladder, the housing including a central section, a first end which engages the end flange such that the central section of the housing is in radially spaced relation from the air bladder, a second opposite end, and a plurality of through holes spaced along the central section of the housing. At least one locking member is positionable externally of the housing for engaging a web roll mounted on the housing, and a biasing assembly extends through the through holes into a space between the housing and the bladder, and is also connected to the at least one locking member for moving the at least one locking member radially outward relative to the housing in response to movement of the bladder when pressurized air is supplied through the air passage. A first angled wall is associated with the first end of the housing and has a second inclination angle which is in the same direction as the first inclination angle of the sloped transition section, but which is of a different value than the first inclination angle so as to pinch the bladder therebetween.

Preferably, the second inclination angle is greater than the first inclination angle.

The central core further includes a sloped end section having a first end and a second end, with the first end of the sloped end section connected to the second end of the central portion, the first end of the sloped end section having an outer diameter greater than an outer diameter of the second end of the sloped end section so as to slope down from the first end portion toward the second end of the sloped end section at a third inclination angle relative to an axis of the air chuck. The air chuck further includes a second angled wall associated with the second end of the housing and having a fourth inclination angle which is in the same direction as the third inclination angle of the sloped end section, but which is of a different value than the third inclination angle so as to pinch the bladder therebetween.

Preferably, the fourth inclination angle is less than the third inclination angle.

In accordance with still another aspect of the present invention, an air chuck includes a central core having an enlarged end flange at a first end thereof, and an air passage for supplying pressurized air to an external surface of the central section; and a resilient, deformable air bladder mounted on the central core. A housing is in surrounding relation to the central core and the air bladder, the housing including a central section, a first end which engages the end flange such that the central section of the housing is in radially spaced relation from the air bladder, a second opposite end, and a plurality of through holes spaced along the central section of the housing. At least one outer leaf is positioned externally of the housing, and at least one inner leaf is positioned between the housing and the bladder, with at least one connecting member movably extending through the through holes and connecting together the at least one outer leaf and the at least one inner leaf, such that movement of the at least one inner leaf in a radial direction in response to movement of the air bladder, results in the same radial movement of the at least one outer leaf.

The above and other objects, features and advantages of the invention will become readily apparent from the following detailed description thereof which is to be read in connection with the accompanying drawings.

BRIEF DESCRIPTION OF THE DRAWINGS

FIG. 5 is a longitudinal cross-sectional view of a housing and leaves of the air chuck of FIG. 4;

FIG. 6 is a longitudinal cross-sectional view of the assembled air chuck of FIGS. 4 and 5, but rotated 90° therefrom, with the air bladder in a deflated condition;

FIG. 7 is an enlarged longitudinal cross-sectional view of a portion of the air chuck of FIG. 6, showing the securement of an end of the air bladder;

FIG. 8 is a longitudinal cross-sectional view of the assembled air chuck of FIG. 6, with the air bladder in an inflated condition;

FIG. 9 is a longitudinal cross-sectional view of an air chuck according to a second embodiment of the present invention; and FIG. 10 is a cross-sectional view of the air chuck of FIG. 9, taken along line 10—10 thereof.

DETAILED DESCRIPTION OF THE PREFERRED EMBODIMENTS

Figure 1:
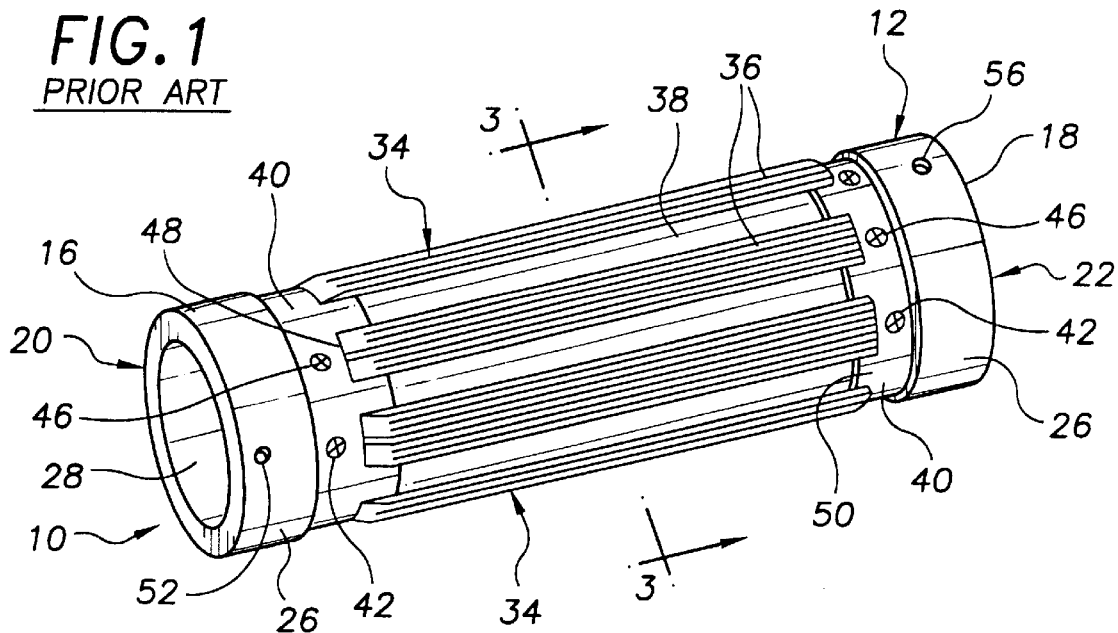
FIG. 1 is a perspective view of an air chuck according to the prior art.
Figure 2:
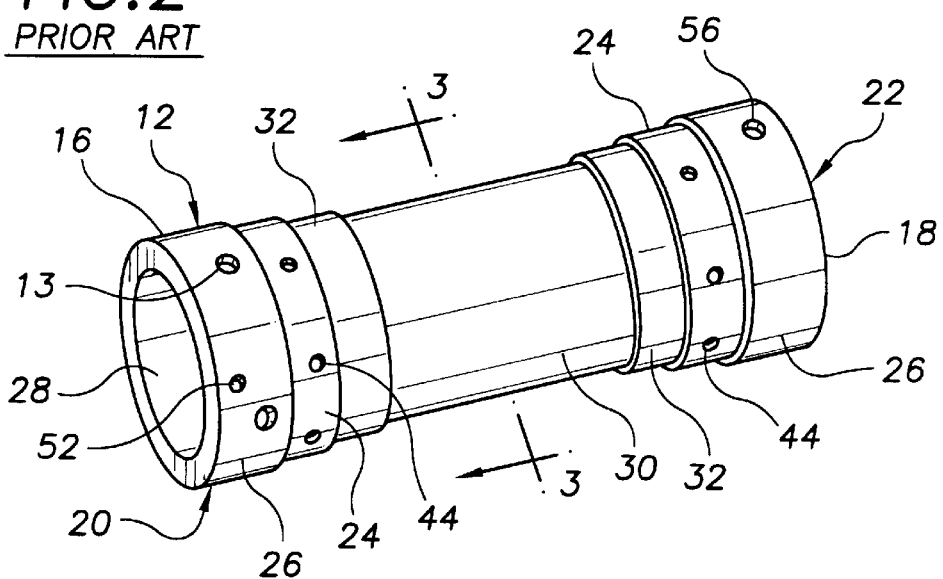
FIG. 2 is a perspective view of the air chuck of FIG. 1, with the leaves removed.
Figure 3:
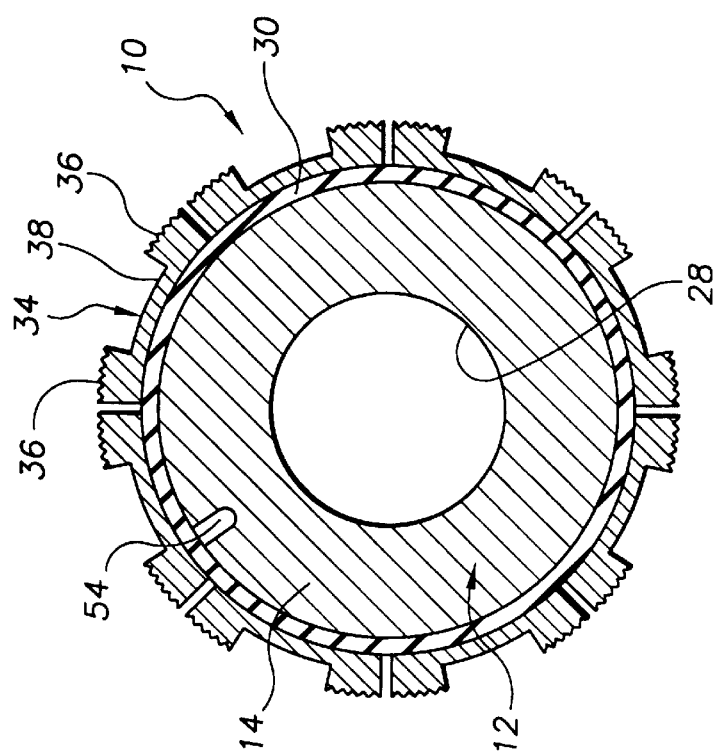
FIG. 3 is a cross-sectional view of the air chuck of FIG. 1, taken along line 3—3 thereof.

Referring to the drawings in detail, and initially to FIGS. 1–3, an air chuck 10 according to the prior art will first be discussed.

As shown therein, air chuck 10 includes a central core 12 having a hollow, central cylindrical portion 14 with a first end 16 and a second opposite end 18. An enlarged, stepped end flange 20 is provided coaxially at first end 16 of central core 12, and an enlarged, stepped end flange 22 is provided coaxially at second end 18 of central core 12. Specifically, each end flange 20 and 22 includes a first annular step 24 having a larger outer diameter than the outer diameter of cylindrical portion 14 and connected therewith, and a second annular step 26 having a larger outer diameter than first annular step 24 and connected therewith. A through bore 28 extends entirely through central core 12, that is, through cylindrical portion 14 and stepped end flanges 20 and 22 so that central core 12 can be mounted on a mandrel and secured thereon by bolts extending through openings 13 in second annular step 26. Alternatively, stepped end flange 20 can be provided with a threaded shaft (not shown) to be threaded into an assembly in a fixed manner, as is well known. In the latter instance, central core 12 can be solid throughout, that is, through bore 28 can be eliminated.

An inflatable rubber air bladder 30 is mounted on cylindrical portion 14 and held tightly thereon by metal bands 32. For example, bladder 30 can be formed as a tubular member stretched over stepped end flange 20 to be positioned about cylindrical portion 14 and held tightly by metal bands 32, as best shown in FIG. 2.

A plurality of lengthwise extending leaves 34 are positioned over cylindrical portion 14, with ends thereof abutting against first annular steps 24, and so that leaves 34 are movable by a small distance in the radial direction. Each leaf 34 has a generally U-shaped cross-sectional configuration, as shown in FIG. 3, that is, with two elongated legs 36 connected by a central section 38. Each leg 36 has a roughened upper surface to provide non-slip gripping of a roll of web material.

Leaves 34 are held down by arcuate hold-down members 40 that overlie first annular steps 24. In this regard, hold-down members 40 have openings 42 therein that align with threaded openings 44 in annular steps 24, and bolts 46 are inserted through openings 42 and threaded into openings 44 to retain hold-down members 40 on annular steps 24. Hold-down members 40 have inner cut-out portions 48 to receive the ends of legs 36 of leaves 34 without obstruction, and thereby define inner fingers 50 that overlie the ends of central sections 38 in order to retain leaves 34 in an overlying position to bladder 30. However, fingers 50 do not tightly clamp down on central sections 38, but rather, merely overlie the same with a small radial distance therebetween. As a result, when bladder 30 expands, bladder 30 is able to push leaves 34 radially out by a small distance such that the upper surfaces of legs 36 of leaves 34 grip the inner surface of a roll of web material to securely hold the roll of web material thereon.

In order to expand bladder 30, second annular step 26 of end flange 20 is provided with a recessed air inflating valve opening 52 which leads to an air passage 54 (FIG. 3) in order to supply air for inflating bladder 30, or remove air for deflating bladder 30. In addition, a threaded valve opening 56 can be provided in second annular step 26 of end flange 22 for supplying air to air passage 54 when the air chuck is designed for permanent air connection.

However, a problem with such arrangement is that air bladder 30 often becomes worn and must be replaced. This is a long and complicated procedure. Specifically, as a first step, leaves 34 must all be removed. Thus, hold-down members 40 must be removed, and then leaves 34 are removed. Then, metal bands 32 which hold the ends of air bladder 30 must be removed, followed by removal of air bladder 30. A reverse procedure is then performed, by applying a new air bladder 30, securing the same by metal bands 32, and then securing leaves 34 thereon. This procedure can take upwards of two or more hours, and results in substantial downtime of the web winding machine.

The present invention, as will now be described with relation to FIGS. 4–10, eliminates this problem. Specifically, there is no need to remove the leaves, the bands or the hold-down members in order to change the bladder, so that the entire bladder changing procedure can take approximately 10 minutes.

Referring first to FIGS. 4–8, there is shown an air chuck 110 according to a first embodiment of the present invention, in which elements corresponding to those of air chuck 10 are denoted by the same reference numerals, but augmented by a prefix of 100.

Air chuck 110 includes a central core 112 having a hollow cylindrical portion 114 with a first end 116 and a second opposite end 118. Central core 112 includes an enlarged, stepped end flange 120 at first end 116. End flange 120 includes a first annular step 124 having a larger outer diameter than the outer diameter of cylindrical portion 114, and a second annular step 126 having a larger outer diameter than first annular step 124 and connected therewith. An outer stepped shoulder 129 is formed between first and second annular steps 124 and 126.

Central core 112 further includes an annular, sloped transition section 123 which connects a first end of cylindrical portion 114 and first annular step 124 of enlarged end flange 120, and is coaxial therewith. Sloped transition section 123 has an outer diameter adjacent to enlarged end flange 120 which is greater than an outer diameter adjacent to the first end of cylindrical portion 114 so as to slope down from enlarged end flange 120 toward cylindrical portion 114 at a first inclination angle. Preferably, the first inclination angle is about 20° relative to the axis of central core 112, although the present invention is not so limited.

In addition, central core 112 includes a sloped end section 125 having a first end 125a and a second end 125b, with first end 125a connected to the opposite end of cylindrical portion 114 and coaxial therewith. First end 125a of sloped end section 125 has an outer diameter greater than the outer diameter of second end 125b of sloped end section 125 so as to slope down from cylindrical portion 114 toward second end 125b of sloped end section 125 at a second inclination angle. Preferably, the second inclination angle is also about 20° relative to the axis of central core 112, although the present invention is not so limited.

A cylindrical tail end section 127 is connected to second end 125b of sloped end section 125 and is coaxially therewith. Tail end section 127 has the same outer diameter as the second end 125b of sloped end section 125.

A through bore 128 extends entirely through central core 112, that is, through cylindrical portion 114, stepped end flange 120, sloped transition section 123, sloped end section 125 and tail end section 127 so that central core 112 can be mounted on a mandrel. In this regard, openings (not shown) can be provided in second annular step 126, similar to openings 13 of the prior art, for removably fixing air chuck 110 on a mandrel. Alternatively, stepped end flange 120 can be provided with a threaded shaft (not shown) to be threaded into an assembly in a fixed manner, as is well known. In the latter instance, central core 112 can be solid throughout, that is, through bore 128 can be eliminated.

Figure 4:
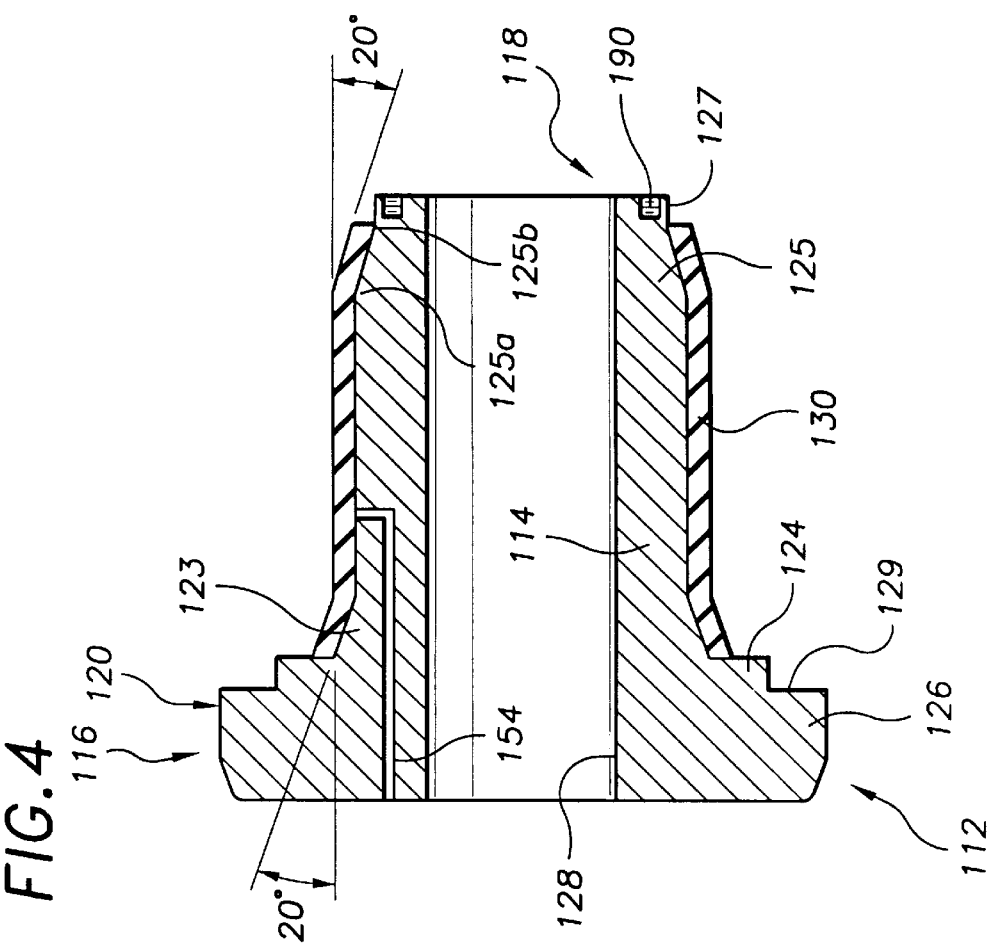
FIG. 4 is a longitudinal cross-sectional view of a core section and air bladder of an air chuck according to a first embodiment of the present invention.

As shown in FIG. 4, an air passage 154 is provided in central core 112 to supply air for inflating a bladder or removing air for deflating the bladder, as will be described hereinafter. In this regard, air passage 154 opens at one end through second annular step 126 and opens at the opposite end radially through cylindrical portion 114.

A resilient, deformable tubular rubber air bladder 130 is mounted on cylindrical portion 114, sloped transition section 123 and sloped end section 125 of central core 112. Air bladder 130 is of an endless belt type and can be stretched over central core 112.

A cylindrical housing 158 is provided in surrounding relation to central core 112 and air bladder 130. Cylindrical housing 158 includes a hollow, cylindrical portion 160 with a first end 162 and a second opposite end 164. An enlarged, stepped end flange 166 is connected coaxially to first end 162 of cylindrical portion 160, and an enlarged, stepped end flange 168 is connected coaxially to second end 164 of cylindrical portion 160.

End flange 166 includes an inwardly directed radial flange 170 and an outwardly directed radial flange 172 which extends axially past radial flange 170, such that there is an inner stepped shoulder 174 between flanges 170 and 172. Inner stepped shoulder 174 mates with and is supported by outer stepped shoulder 129 of central core 112 when cylindrical housing 158 is mounted on central core 112.

In addition, the radially inner surface 176 of flange 170 has a third inclination angle in the same direction as the first inclination angle of sloped transition section 123. However, the third inclination angle of radially inner surface 176 is preferably greater than the first inclination angle of sloped transition section 123. Preferably, the third inclination angle is about 25° relative to the axis of housing 158, although the present invention is not so limited. In addition, the innermost corner 176a of radially inner surface 176 is slightly rounded.

The spacing between the outer sloped surface of sloped transition section 123 and radially inner surface 176 is similar to the thickness of bladder 130 at the end of sloped transition section 123 which is connected to end flange 120. However, because of the different inclinations of the first and third inclination angles, this spacing reduces toward the end of sloped transition section 123 that is connected with cylindrical portion 114. As a result, there is a wedge shaped pinching of bladder 130 between rounded edge 176a and the upper sloped surface of sloped transition section 123 when central core 112 is fit within cylindrical housing 158. This takes the place of the metal bands 32 of the prior art of FIGS. 1–3, to securely hold bladder 130 in position, and to seal the end of bladder 130 against sloped transition section 123.

It will also be appreciated that this wedge shaped pinching is very different from two surfaces having equal angles, which only provide a uniform clamping or compression effect on the bladder, but do not provide a pinching at a circumferential line location as in the present invention, which causes a flaring out of the ends of bladder 130 for better securement. However, the present invention is also designed to cover the less favorable construction where the angles are the same and the spacing between sloped transition section 123 and rounded edge 176a is less than the thickness of bladder 130 to cause a clamping effect thereof. This part of the invention, as will be discussed hereinafter, can be used with the aspect of the present invention where both ends of bladder 130 are simultaneously clamped, which occurs merely by insertion of central core 112 into housing 158 when changing bladder 130.

End flange 168 includes a first annular section 178 connected with second end 164 of cylindrical portion 160 and including a portion 178a extending radially inward of cylindrical portion 160 and a portion 178b extending radially outward of cylindrical portion 160. As a result, an annular recess 180 is formed between outwardly directed radial flange 172, the outer surface of cylindrical portion 160 and radially outward portion 178b, and an annular recess 181 is formed between radially inner surface 176, the inner surface of cylindrical portion 160 and radially inward portion 178a, with both recesses 180 and 181 being used for reception of the leaves, as will be described hereinafter.

The radially inner surface 179 of radially inward portion 178a has a fourth inclination angle in the same direction as the second inclination angle of sloped end section 125. However, the fourth inclination angle of radially inner surface 179 is preferably less than the second inclination angle of sloped end section 125. Preferably, the fourth inclination angle is about 15° relative to the axis of housing 158, although the present invention is not so limited. In addition, the outermost corner 179a of radially inner surface 179 is slightly rounded.

The spacing between the outer sloped surface of sloped end section 125 and radially inner surface 179 is similar to the thickness of bladder 130 at the second end 125b of sloped end section 125. However, because of the different inclinations of the second and fourth inclination angles, this spacing reduces toward the first end 125a of sloped end section 125. As a result, there is a wedge shaped pinching of bladder 130 between the outer surface at the first edge 125a of sloped end section 125 and the radially inner surface 179 of radially inward portion 178a that is closer to cylindrical portion 160, when central core 112 is fit within cylindrical housing 158. This takes the place of the metal bands 32 of the prior art of FIGS. 1–3, to securely hold the opposite end of bladder 130 in position, and to seal this end of bladder 130 against sloped end section 125. This is shown in FIG. 6, and in the detail drawing of FIG. 7.

It will be appreciated that, in view of the similar variation in inclinations between the first and third inclination angles, and the second and fourth inclination angles, there is simultaneous sealing of both ends of bladder 130 when central core 112 is fit within cylindrical housing 158. This pinching effect due to the different inclinations between the first and third inclination angles, and the second and fourth inclination angles, is very different from two surfaces having equal angles, which only provide a uniform clamping or compression effect on the bladder, but do not provide a pinching at a circumferential line location as in the present invention. The pinching causes a flaring out of the ends of bladder 130 for better securement. However, the present invention is also designed to cover the less favorable construction where the angles are the same and the spacing between sloped transition section 123 and rounded edge 176a is less than the thickness of bladder 130 to cause a clamping effect thereof. In such case, there is still a simultaneous clamping of both ends of bladder 130, merely by insertion of central core 112 into housing 158 when changing bladder 130. This is very different from the prior art discussed above.

End flange 168 further includes a second annular section 182 connected with first annular section 178 and including a portion 182a extending radially inward of radially inward portion 178a and a portion 182b extending radially outward of radially outward portion 178b. The inner diameter of radially inward portion 182a is the same as the outer diameter of tail end section 127 so as to mate therewith when assembled together.

An inner annular abutment 184 extends inwardly from radially inward portion 182a, and tail end section 127 abuts thereagainst. A plurality of recessed bolt holes 186 extend through inner annular abutment 184, such that bolts 188 can extend through bolt holes 186 and be secured within aligned threaded openings 190 in the end of tail end section 127 so as to removably secure core section 112 to housing 158.

A plurality of through holes 192 extend through cylindrical portion 160 of cylindrical housing 158 in rows that extend in the lengthwise direction thereof. Although only two through holes 192 are shown in FIGS. 5, 6 and 8 in each row, this number may vary, and will depend on the length of air chuck 110. Also, the number of rows of through holes 192 can vary, although four is a preferred number of rows.

A plurality of leaf assemblies 194 are also provided. Specifically, each leaf assembly 194 includes an outer leaf 196 positioned in annular recess 180, an inner leaf 198 positioned in annular recess 181 and connecting bars 200 slidably extending through holes 192 in cylindrical housing 160 and connected at opposite ends to respective leaves 196 and 198. It will be appreciated that, although a single leaf assembly 194 would render the invention operative, it is preferable to provide a plurality of such leaf assemblies 194.

Each outer leaf 196 can have any suitable form. For example, each outer leaf 196 can have the shape of leaves 34 of the prior art of FIGS. 1–3, with each outer leaf 196 connected at the central section thereof. Alternatively, and preferably, each outer leaf 196 and each inner leaf 198 merely have a substantially rectangular, arcuate plate configuration, as discussed hereinafter with reference to the second embodiment of the invention.

In addition, the inner surfaces of inner leaves 198 have annular recesses 202 at opposite ends thereof, and annular rubber members 204 are fit therein, as best shown in FIGS. 6 and 7.

As an alternative, outer leaves 196 can be eliminated. In such case, the radially outer ends of rods 200 would function as a locking member positionable externally of housing 158 for engaging a web roll mounted on housing 158. Thus, the lower end of rods 200 and the inner leaves 198 would function as a biasing assembly extending through holes 192 into a space between housing 158 and bladder 130, and also connected with the locking members for moving the locking members radially outward relative to housing 158 in response to movement of bladder 130 when pressurized air is supplied through air passage 154.

In operation, when air chuck 110 is held on a mandrel (not shown), a roll of web material is placed on air chuck 110. Then, pressurized air is supplied to air passage 154. This, in turn, causes air bladder 130 to expand in a radial outward direction from the position shown in FIG. 6 to the position shown in FIG. 8. As a result, inner leaves 198 are pushed in the radial outward direction, and thereby cause outer leaves 196 to move in the same direction. Thus, outer leaves 196 engage the inner surface of the roll of web material so that the roll of web material rotates with air chuck 110 on the mandrel. When the air pressure is removed, annular rubber members 204 function as stretched spring members to retract leaf assemblies 194 radially inward to allow removal of the roll from air chuck 110.

When air bladder 130 becomes worn and must be changed, there is no need to remove leaf assemblies 194. Rather, it is only necessary to remove bolts 188, and pull central core 112 in an axial direction out from cylindrical housing 158. Then, air bladder 130 is slid off of central core 112, and a new air bladder 130 is placed thereon. Central core 112 is then slid back into cylindrical housing 158 and secured thereto by bolts 188.

During the insertion operation, air bladder 130 is securely held at opposite ends thereof by the wedge shaped pinching of bladder 130, as discussed above. The entire operation takes approximately 10 minutes, in comparison with the hours needed in the prior art.

Thus, with the present invention, there is still a simultaneous clamping of both ends of bladder 130, merely by insertion of central core 112 into housing 158 when changing bladder 130, and then drawing central core 112 further into housing 158 by tightening bolts 188. There is no need to remove the leaf assemblies. This simultaneous clamping occurs whether the clamping occurs by reason of equal inclinations of the first and third inclination angles and the second and fourth inclination angles, or whether the clamping is due to unequal angles to cause a biting or pinching effect, although the latter is preferable.

Referring now to FIGS. 9 and 10, there is shown an air chuck 310 according to a second embodiment of the present invention, in which elements corresponding to those of air chuck 110 are denoted by the same reference numerals, but augmented by 200 so as to be provided with a prefix of 300.

Specifically, one problem is with the manufacture of air chuck 110 due to the need to assemble leaf assemblies 194 therewith with cylindrical housing 158, that is, the difficulties arise due to inwardly directed radial flange 170 and radially inward portion 178a which limit access to the interior of housing 158, particularly when the inner diameter thereof is smaller than that shown in the drawings.

Air chuck 310 includes a central core 312 having a first end 316 and a second opposite end 318. Specifically, central core 312 includes a solid cylindrical portion 314. Further, central core 312 includes an enlarged, stepped end flange 320 at the first end 316. End flange 320 includes a first annular step 324 having a larger outer diameter than the outer diameter of cylindrical portion 314.

Central core 312 further includes a sloped transition section 323 which connects a first end of cylindrical portion 314 and first annular step 324 of enlarged end flange 320, and is coaxial therewith. Sloped transition section 323 has an outer diameter adjacent to enlarged end flange 320 which is greater than an outer diameter adjacent to first end 316 of cylindrical portion 314 so as to slope down from enlarged end flange 320 toward cylindrical portion 314 at a first inclination angle. Preferably, the first inclination angle is about 20° relative to the axis of central core 312, although the present invention is not so limited.

In addition, central core 312 includes a sloped end section 325 having a first end and a second end, with the first end connected to the second end of cylindrical portion 314 and being coaxial therewith. The first end of sloped end section 325 has an outer diameter greater than the outer diameter of the second end of sloped end section 325 so as to slope down from cylindrical portion 314 toward the second end of sloped end section 325 at a second inclination angle. Preferably, the second inclination angle is also about 20° relative to the axis of central core 312, although the present invention is not so limited.

A cylindrical tail end section 327 is connected to the second end of sloped end section 325 and is coaxially therewith. Tail end section 327 has the same outer diameter as the second end of sloped end section 325.

Stepped end flange 320 can be provided with a threaded shaft 331, only a portion of which is shown, to be threaded into an assembly in a fixed manner, as is well known.

As shown, an air passage 354 is provided in central core 312 to supply air for inflating a bladder or removing air for deflating the bladder, as will be described hereinafter. In this regard, air passage 354 opens at one end through tail end section 127 and opens at the opposite end radially through cylindrical portion 314.

A resilient, deformable air bladder 330 is mounted on cylindrical portion 314, sloped transition section 323 and sloped end section 325 of central core 312. Air bladder 330 is of an endless belt type and can be stretched over central core 312.

A cylindrical housing 358 is provided in surrounding relation to central core 312 and air bladder 330. Cylindrical housing 358 includes a hollow cylindrical portion 360 with a first end 362 and a second opposite end 364. The first end 362 of cylindrical portion 360 is supported by first annular step 324 of central core 312.

In place of enlarged, stepped end flange 166 of the first embodiment, air chuck 310 includes a first annular ring 370 which is substantially similar to inwardly directed radial flange 170 of stepped end flange 166. Annular ring 370 is fit over central core 312 and bladder 330, and within housing 358. The radially inner surface 376 of annular ring 370 has a third inclination angle in the same direction as the first inclination angle of sloped transition section 323. However, the third inclination angle of radially inner surface 376 is preferably greater than the first inclination angle of sloped transition section 323. Preferably, the third inclination angle is about 25° relative to the axis of housing 358, although the present invention is not so limited. In addition, the innermost corner 376a of radially inner surface 376 is slightly rounded.

The spacing between the outer sloped surface of sloped transition section 323 and radially inner surface 376 is similar to the thickness of bladder 330 at the end of sloped transition section 323 connected to end flange 320. However, because of the different inclinations of the first and third inclination angles, this spacing reduces toward the end of sloped transition section 323 that is connected with cylindrical portion 314. As a result, there is a wedge shaped pinching of bladder 330 between rounded edge 376a and the upper sloped surface of sloped transition section 323 when central core 312 is fit within cylindrical housing 358. This takes the place of the metal bands 32 of the prior art of FIGS. 1–3, to securely hold bladder 330 in position, and to seal the end of bladder 330 against sloped transition section 323.

It will also be appreciated that this wedge shaped pinching is very different from two surfaces having equal angles, which only provide a uniform clamping or compression effect on the bladder, but do not provide a pinching at a circumferential line location as in the present invention, which causes a flaring out of the ends of bladder 330 for better securement. However, the present invention is also designed to cover the less favorable construction where the angles are the same and the spacing between sloped transition section 323 and rounded edge 376a is less than the thickness of bladder 330 to cause a clamping effect thereof. This part of the invention, as will be discussed hereinafter, can be used with the aspect of the present invention where both ends of bladder 330 are simultaneously clamped, which occurs merely by insertion of central core 312 into housing 358 when changing bladder 330.

In place of end flange 168 of the first embodiment, a second annular ring 368 is provided in surrounding relation to the opposite end of central core 312 so as to surround sloped end section 325 and tail end section 327, and so as to be positioned within housing 358.

Second annular ring 368 includes a first annular section 378 having a radially inner surface 379 with a fourth inclination angle in the same direction as the second inclination angle of sloped end section 325 and surrounding sloped end section 325. However, the fourth inclination angle of radially inner surface 379 is preferably less than the second inclination angle of sloped end section 325. Preferably, the fourth inclination angle is about 15° relative to the axis of housing 358, although the present invention is not so limited. In addition, the outermost corner 379a of radially inner surface 379 is slightly rounded.

The spacing between the outer sloped surface of sloped end section 325 and radially inner surface 379 is similar to the thickness of bladder 330 at the second end of sloped end section 325 which connects to tail end section 327. However, because of the different inclinations of the second and fourth inclination angles, this spacing reduces toward the first end of sloped end section 325 which connects to cylindrical portion 314. As a result, there is a wedge shaped pinching of bladder 330 between the outer surface at the first edge of sloped end section 325 and the radially inner surface 379 of first annular section 378 that is closer to cylindrical portion 360, when central core 312 is fit within cylindrical housing 358. This takes the place of the metal bands 32 of the prior art of FIGS. 1–3, to securely hold the opposite end of bladder 330 in position, and to seal this end of bladder 330 against sloped end section 325. This is shown in FIG. 9.

It will be appreciated that, in view of the similar variation in inclinations between the first and third inclination angles, and the second and fourth inclination angles, there is simultaneous sealing of both ends of bladder 330 when central core 312 is fit within cylindrical housing 358. This pinching effect due to the different inclinations between the first and third inclination angles, and the second and fourth inclination angles, is very different from two surfaces having equal angles, which only provide a uniform clamping or compression effect on the bladder, but do not provide a pinching at a circumferential line location as in the present invention. The pinching causes a flaring out of the ends of bladder 330 for better securement. However, the present invention is also designed to cover the less favorable construction where the angles are the same and the spacing between sloped transition section 323 and rounded edge 376a is less than the thickness of bladder 330 to cause a clamping effect thereof. In such case, there is still a simultaneous clamping of both ends of bladder 330, merely by insertion of central core 312 into housing 358 when changing bladder 330. This is very different from the prior art discussed above.

Second annular ring 368 further includes a second annular section 382 connected with first annular section 378, with second annular section 382 having an inner diameter which is the same as the outer diameter of tail end section 327 so as to mate therewith when assembled together.

Second annular ring 368 also includes an annular abutment plate 384 connected to the opposite end of second annular section 382 and against which tail end section 327 abuts. A plurality of recessed bolt holes 386 extend through annular abutment plate 384, such that bolts 388 can extend through bolt holes 386 and be secured within aligned threaded openings 390 in the end of tail end section 327 so as to removably secure core section 312 to housing 358.

A plurality of through holes 392 extend through cylindrical portion 360 of cylindrical housing 358 in rows that extend in the lengthwise direction thereof. Although only three through holes 392 are shown in FIG. 9 in each row, this number may vary, depending upon the length of air chuck 310. Also, the number of rows of through holes 392 can vary, although four is a preferred number of rows, as shown in FIG. 10.

A plurality of leaf assemblies 394 are also provided. Specifically, each leaf assembly 394 includes an outer leaf 396 positioned on the outer surface of hollow cylindrical portion 360, an inner leaf 398 positioned in an annular recess 381 between cylindrical portion 314 and bladder 330, and cylindrical portion 360, and connecting bars 400 slidably extending through holes 392 in cylindrical housing 360 and connected at opposite ends to respective leaves 396 and 398.

It will be appreciated that, although a single leaf assembly 394 would render the invention operative, it is preferable to provide a plurality of such leaf assemblies 394.

Each outer leaf 396 and inner leaf 398 can have any suitable form. As shown, each outer leaf 396 and each inner leaf 398 have a substantially rectangular, arcuate plate configuration.

As an alternative, outer leaves 396 can be eliminated. In such case, the radially outer ends of rods 400 would function as a locking member positionable externally of housing 358 for engaging a web roll mounted on housing 358. Thus, the lower end of rods 400 and the inner leaves 398 would function as a biasing assembly extending through holes 392 into a space between housing 358 and bladder 330, and also connected with the locking members for moving the locking members radially outward relative to housing 358 in response to movement of bladder 330 when pressurized air is supplied through air passage 354.

In operation, when air chuck 310 is held on a mandrel (not shown), a roll of web material is placed on air chuck 310. Then, pressurized air is supplied to air passage 354. This, in turn, causes air bladder 330 to expand in a radial outward direction from the position shown in FIG. 9. As a result, inner leaves 398 are pushed in the radial outward direction, and thereby cause outer leaves 396 to move in the same direction, until outer leaves 396 engage the inner surface of the roll of web material so that the roll of web material rotates with air chuck 310 on the mandrel. When the air pressure is removed, leaf assemblies 394 can move radially inward to allow removal of the roll from air chuck 310.

When air bladder 330 becomes worn and must be changed, there is no need to remove leaf assemblies 394. Rather, it is only necessary to remove bolts 388, and pull central core 312 in an axial direction out from cylindrical housing 358. Then, air bladder 330 is slid off of central core 312, and a new air bladder 330 is placed thereon. Central core 312 is then slid back into cylindrical housing 358 and secured thereto by bolts 388.

During the insertion operation, air bladder 330 is securely held at opposite ends thereof by the clamping or the wedge shaped pinching of bladder 330, as discussed above. The entire operation takes approximately 10 minutes, in comparison with the hours needed in the prior art.

Thus, with the present invention, there is still a simultaneous clamping of both ends of bladder 330, merely by insertion of central core 312 into housing 358 when changing bladder 330, and then drawing central core 312 further into housing 358 by tightening bolts 388. There is no need to remove the leaf assemblies. This simultaneous clamping occurs whether the clamping occurs by reason of equal inclinations of the first and third inclination angles and the second and fourth inclination angles, or whether the clamping is due to unequal angles to cause a biting or pinching effect, although the latter is preferable.

It will be appreciated that various modifications can be made within the scope of the present invention. For example, cylindrical portions 114 and 314 can be made into a polygonal cross-sectional shape, and the inner surface of housings 158 and 358 can be similarly shaped. Further, although the outer surface of housings 158 and 358 have a cylindrical configuration, they also can have a polygonal shape.

Further, although the present invention has been discussed relative to outer leaves 196, 396 and inner leaves 198, 398, it will be appreciated that inner leaves 198, 398 can be eliminated. In such case, for example, bladders 130, 330 could directly move the lower ends of connecting members 200, 400, with a flange or other stop thereon to prevent escape of the connecting members entirely out of housing 158, 358.

Still further, it is possible that only one end of bladders 130, 330 could be secured with the wedge shaped pinching action, with the opposite end merely held in a secure manner between two surfaces with a constant spacing therebetween. However, wedge shaped pinching of both ends of bladders 130, 330 is preferred.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. An air chuck comprising:
   a central core including:
      a central portion having a first end and a second opposite end,
      an enlarged end flange at the first end of said central core,
      a sloped transition section which connects said first end of said central portion and said enlarged end flange, said sloped transition section having an outer diameter adjacent to said enlarged end flange which is greater than an outer diameter adjacent to said first end of said central portion so as to slope down from said enlarged end flange toward said central portion at a first inclination angle relative to an axis of said air chuck,
      a sloped end section having a first end and a second end, with said first end of said sloped end section connected to said second end of said central portion, said first end of said sloped end section having an outer diameter greater than an outer diameter of said second end of said sloped end section so as to slope down from said first end portion toward said second end of said sloped end section at a second inclination angle relative to an axis of said air chuck, and
      an air passage for supplying pressurized air to an external surface of said central section;
   a resilient, deformable air bladder mounted on said central portion, said sloped transition section and said sloped end section;
   a unitary housing removably positioned in surrounding relation to said central core and said air bladder, said housing including:
      a central section surrounding said central portion of said central core,
      a first end which engages said end flange such that said central section of said housing is in radially spaced relation from said air bladder,
      a second opposite end, and
      a plurality of through holes spaced along said central section of said housing;
   at least one locking member positionable externally of said housing for engaging a web roll mounted on said housing;
   a biasing assembly extending through said through holes into a space between said housing and said bladder, and also connected to said at least one locking member for moving said at least one locking member radially outward relative to said housing in response to movement of said bladder when pressurized air is supplied through said air passage;

a first angled wall associated with said first end of said housing and having a third inclination angle which is in the same direction as said first inclination angle of said sloped transition section, so as to clamp said bladder therebetween;

a second angled wall associated with said second end of said housing and having a fourth inclination angle which is in the same direction as said second inclination angle of said sloped end section, so as to clamp said bladder therebetween; and wherein said central core and air bladder thereon are movable as a unit in an axial direction thereof out of and into said housing to change said air bladder on said central core, without removal of said at least one locking member and said at least one biasing assembly from said housing, and during insertion of said central core and air bladder into said housing, opposite ends of said bladder are wedged in a clamping manner by said sloped transition section and said first angled wall, and said sloped end section and said second angled wall, respectively.

2. An air chuck according to claim 1, wherein said third inclination angle is greater than said first inclination angle.

3. An air chuck according to claim 2, wherein said fourth inclination angle is less than said second inclination angle.

4. An air chuck according to claim 1, wherein said first and second inclination angles are substantially equal.

5. An air chuck according to claim 1, wherein said first angled wall is connected with said first end of said housing, and said second angle wall is connected with said second end of said housing.

6. An air chuck according to claim 1, further comprising:

a first annular ring positioned between said first end of said housing and said bladder, said first annular ring including said first angled wall as an inner wall thereof; and a second annular ring positioned between said second end of said housing and said bladder, said second annular ring including said second angled wall as an inner wall thereof.

7. An air chuck according to claim 1, wherein:

said at least one locking member includes at least one outer leaf positioned externally of said housing; and said biasing assembly includes:
  at least one inner leaf positioned between said housing and said bladder; and
  at least one connecting member extending through said through holes and connecting together said at least one outer leaf and said at least one inner leaf, such that movement of said at least one inner leaf in a radial direction in response to movement of said air bladder, results in the same radial movement of said at least one outer leaf.

8. An air chuck according to claim 7, wherein there are a plurality of outer and inner leaves arranged circumferentially around said air chuck.

9. An air chuck according to claim 1, further including an end cap assembly at said second end of said housing for securement to said central core and for further pulling said central core into said housing to increase the clamping of said opposite ends of said bladder.

10. An air chuck comprising:

a central core including:
  a central portion having a first end and a second opposite end,
  an enlarged end flange at the first end of said central core,
  a sloped transition section which connects said first end of said central portion and said enlarged end flange, said sloped transition section having an outer diameter adjacent to said enlarged end flange which is greater than an outer diameter adjacent to said first end of said central portion so as to slope down from said enlarged end flange toward said central portion at a first inclination angle relative to an axis of said air chuck, and
  an air passage for supplying pressurized air to an external surface of said central section;

a resilient, deformable air bladder mounted on said central portion and said sloped transition section;

a housing in surrounding relation to said central core and said air bladder, said housing including:
  a central section,
  a first end which engages said end flange such that said central section of said housing is in radially spaced relation from said air bladder,
  a second opposite end, and
  a plurality of through holes spaced along said central section of said housing;

at least one locking member positionable externally of said housing for engaging a web roll mounted on said housing;

a biasing assembly extending through said through holes into a space between said housing and said bladder, and also connected to said at least one locking member for moving said at least one locking member radially outward relative to said housing in response to movement of said bladder when pressurized air is supplied through said air passage; and a first angled wall associated with said first end of said housing and having a second inclination angle which is in the same direction as said first inclination angle of said sloped transition section, but which is of a different value than the first inclination angle so as to pinch said bladder therebetween.

11. An air chuck according to claim 10, wherein said second inclination angle is greater than said first inclination angle.

12. An air chuck according to claim 10, wherein said first angled wall is connected with said first end of said housing.

13. An air chuck according to claim 10, further comprising an annular ring positioned between said first end of said housing and said bladder, said annular ring including said first angled wall as an inner wall thereof.

14. An air chuck according to claim 10, wherein:

said at least one locking member includes at least one outer leaf positioned externally of said housing; and said biasing assembly includes:
  at least one inner leaf positioned between said housing and said bladder; and
  at least one connecting member extending through said through holes and connecting together said at least one outer leaf and said at least one inner leaf, such that movement of said at least one inner leaf in a radial direction in response to movement of said air bladder, results in the same radial movement of said at least one outer leaf.

15. An air chuck according to claim 14, wherein there are a plurality of outer and inner leaves arranged circumferentially around said air chuck.

16. An air chuck according to claim 10, further including an end cap assembly at said second end of said housing for securement to said central core.

17. An air chuck according to claim 10, wherein:

said central core further includes a sloped end section having a first end and a
second end, with said first end of said sloped end section connected to said second end of said central portion, said first end of said sloped end section having an outer diameter greater than an outer diameter of said second end of said sloped end section so as to slope down from said first end portion toward said second end of said sloped end section at a third inclination angle relative to an axis of said air chuck, and said air chuck further includes a second angled wall associated with said second end of said housing and having a fourth inclination angle which is in the same direction as said third inclination angle of said sloped end section, but which is of a different value than the third inclination angle so as to pinch said bladder therebetween.

18. An air chuck according to claim 17, wherein said fourth inclination angle is less than said third inclination angle.

19. An air chuck according to claim 17, wherein said third angled wall is connected with said second end of said housing.

20. An air chuck according to claim 17, further comprising:

an annular ring positioned between said second end of said housing and said bladder, said annular ring including said third angled wall as an inner wall thereof.

* * * * *